United States Patent
Yoon et al.

(10) Patent No.: US 10,144,854 B2
(45) Date of Patent: *Dec. 4, 2018

(54) ADHESIVE COMPOSITION FOR TOUCH PANEL, ADHESIVE FILM AND TOUCH PANEL

(71) Applicant: LG Chem, Ltd., Seoul (KR)

(72) Inventors: Chan Oh Yoon, Cheongju-si (KR); Eun Kyung Park, Seoul (KR); Bu Gi Jung, Anyang-si (KR); Jang Soon Kim, Seongnam-si (KR); Sung Chan Park, Seoul (KR); Won Ho Kim, Seoul (KR)

(73) Assignee: LG Chem, Ltd. (KR)

( * ) Notice: Subject to any disclaimer, the term of this patent is extended or adjusted under 35 U.S.C. 154(b) by 416 days.

This patent is subject to a terminal disclaimer.

(21) Appl. No.: 14/782,330

(22) PCT Filed: Feb. 27, 2014

(86) PCT No.: PCT/KR2014/001623
§ 371 (c)(1),
(2) Date: Dec. 21, 2015

(87) PCT Pub. No.: WO2014/163300
PCT Pub. Date: Oct. 9, 2014

(65) Prior Publication Data
US 2016/0108294 A1    Apr. 21, 2016

(30) Foreign Application Priority Data

Apr. 5, 2013  (KR) .................. 10-2013-0037599

(51) Int. Cl.
*C09J 133/08*    (2006.01)
*G06F 3/041*    (2006.01)
(Continued)

(52) U.S. Cl.
CPC ............... *C09J 133/08* (2013.01); *C09J 4/00* (2013.01); *G06F 3/041* (2013.01); *C08F 220/18* (2013.01)

(58) Field of Classification Search
CPC . C09J 4/00–4/06; C09J 133/00–133/26; C08F 220/00–220/70
See application file for complete search history.

(56) References Cited

U.S. PATENT DOCUMENTS

| | | | |
|---|---|---|---|
| 2011/0070434 A1* | 3/2011 | Hirose | ................... C09J 7/0217 428/355 AC |
| 2012/0214936 A1 | 8/2012 | Fujita et al. | |
| 2013/0040123 A1 | 2/2013 | Cho et al. | |

FOREIGN PATENT DOCUMENTS

| CN | 102604563 A | 7/2012 |
|---|---|---|
| CN | 102643618 A | 8/2012 |

(Continued)

OTHER PUBLICATIONS

Jordan et al. Intrinsic Viscosity-Number Average Molecular Weight Relationship for poly(n-Octadecyl Acrylate) and poly( N-n-Octadecylacrylamide). J. Ameri. Oil Chemists Soc., (1966); pp. 563-567.*

(Continued)

*Primary Examiner* — Prashant J Khatri
(74) *Attorney, Agent, or Firm* — Lerner, David, Littenberg, Krumholz & Mentlik, LLP (57) ABSTRACT

Provided are an adhesive composition for a touch panel, including: a hydrophilic functional group-containing monomer and an adhesion promoter, wherein a dielectric constant at a frequency of 100 kHz to 2 MHz is 3.5 or less, and a storage modulus is $1.0 \times 10^5$ Pa to $7.0 \times 10^5$ Pa at 25° C. to 85° C., and an adhesive film including an adhesive layer including a cured product of the adhesive composition for a touch panel. In addition, provided is a touch panel including: a (Continued)

conductive plastic film having a conductive layer formed on one surface; and an adhesive layer attached onto the conductive layer and including a cured product of the adhesive composition for a touch panel.

11 Claims, 4 Drawing Sheets

(51) Int. Cl.
*C09J 4/00* (2006.01)
*C08F 220/18* (2006.01)

(56) References Cited

FOREIGN PATENT DOCUMENTS

| EP | 2679646 A2 | 1/2014 |
|---|---|---|
| JP | 2010007044 A | 1/2010 |
| KR | 1020120084265 A | 7/2012 |
| TW | 201231584 A | 8/2012 |
| WO | 2012112856 A1 | 8/2012 |
| WO | 2013048934 A1 | 4/2013 |

OTHER PUBLICATIONS

European Search Report dated Feb. 5, 2016 corresponding to European Patent Application No. 14780018.9.
Chinese Office Action dated Jun. 1, 2016 corresponding to Chinese Application No. 201480020291.9.
International Search Report for PCT/KR2014/001623 dated Jun. 24, 2014.

* cited by examiner

ADHESIVE COMPOSITION FOR TOUCH PANEL, ADHESIVE FILM AND TOUCH PANEL

CROSS REFERENCE TO RELATED APPLICATION

This application claims the priority of Korean Patent Application No. 10-2013-0037599, filed on Apr. 5, 2013 in the KIPO (Korean Intellectual Property Office). Further, this application is the National Phase application of International Application No. PCT/KR2014/001623 filed Feb. 27, 2014, which designates the United States and was published in Korean.

TECHNICAL FIELD

The present invention relates to an adhesive composition for a touch panel, an adhesive film, and a touch panel.

BACKGROUND ART

Recently, electronic devices such as personal digital assistant (PDA), a mobile communication terminal, a vehicle navigation, and the like, form a large market. Technical goals to be pursed of the above-described electronic devices mainly include thin thickness, light weight, low power consumption, higher resolution, and high brightness, and the like.

Meanwhile, in electronic devices equipped with a touch screen or a touch panel switch in an input operation portion, a transparent conductive plastic film is used for light weight, breakage prevention, and the like. An example of the transparent conductive plastic film includes a film having a polyethylene terephthalate (PET) film as a substrate, and having a conductive layer such as an indium tin oxide (ITO) formed on one surface of the PET film, wherein the film is stacked on a conductive glass, a reinforcement material, a decorative film, and the like, by an adhesive layer.

In the touch screen or the touch panel, adhesive used for attachment of a transparent conductive film requires various physical properties such as a step-absorbing property capable of absorbing a printing step by the decorative film; and durability capable of inhibiting occurrence of white turbidity phenomenon when the touch screen or the touch panel is exposed to severe conditions such as high temperature or high humidity conditions.

DISCLOSURE

Technical Problem

An aspect of the present invention is to provide an adhesive composition for a touch panel having excellent step-absorbing property, high temperature reliability, and excellent reliability against white turbidity phenomenon.

Another aspect of the present invention is to provide an adhesive film using the adhesive composition for a touch panel.

Still another aspect of the present invention is to provide a touch panel to which the adhesive film is applied.

Technical Solution

In accordance with one aspect of the present invention, there is provided an adhesive composition for a touch panel, including: a hydrophilic functional group-containing monomer and an adhesion promoter, wherein a dielectric constant at a frequency of about 100 kHz to about 2 MHz is about 3.5 or less, and a storage modulus is about $1.0\times10^5$ Pa to about $7.0\times10^5$ Pa at about 25° C. to about 85° C.

The hydrophilic functional group-containing monomer may be at least one selected from the group consisting of a hydroxyl group-containing monomer, an amino group-containing monomer, a carboxyl group-containing monomer, a sulfonic group-containing monomer, a morpholine group-containing monomer, a glycidyl group-containing monomer, and combinations thereof.

The hydrophilic functional group-containing monomer may have a content of about 30 parts by weight or less, based on 100 parts by weight of a (meth)acrylic acid ester-based monomer.

A polymer molecular weight of the (meth)acrylic acid ester-based monomer and the hydrophilic functional group-containing monomer may be about 600,000 to about 1,200,000.

The (meth)acrylic acid ester-based monomer may be alkyl(meth)acrylate, and alkyl of the alkyl(meth)acrylate may be linear or branched $C_1$-$C_{14}$ alkyl.

The (meth)acrylic acid ester-based monomer may be at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and combinations thereof.

The adhesion promoter may be at least one selected from the group consisting of an amine-based liquid polymer, polyamine, a petroleum resin, polybutene, an acrylic modified resin, an acryloyl morpholine resin, and combinations thereof.

The adhesive composition for a touch panel may further include: a molecular weight regulator.

The molecular weight regulator may be at least one selected from the group consisting of 2-mercaptoacetate, n-dodecylmercaptan, 4-4' triobisbenzenetriol, and combinations thereof.

The adhesive composition for a touch panel may further include: a photoinitiator.

The photoinitiator may be at least one selected from the group consisting of a benzoin-based initiator, a hydroxy ketone-based initiator, an amino-ketone-based initiator, caprolactam and combinations thereof.

In accordance with another aspect of the present invention, there is provided an adhesive film including an adhesive layer including a cured product of the adhesive composition for a touch panel as described above.

A dielectric constant of the adhesive layer at a frequency of about 100 kHz to about 2 MHz may be 3.5 or less, and a storage modulus of the adhesive layer may be about $1.0\times10^5$ Pa to about $7.0\times10^5$ Pa at about 25° C. to about 85° C.

In accordance with another aspect of the present invention, there is provided a touch panel including: a conductive plastic film having a conductive layer formed on one surface; and an adhesive layer attached onto the conductive layer and including a cured product of the adhesive composition for a touch panel as described above.

The conductive plastic film may be a polyethylene terephthalate film having an indium tin oxide (ITO) (conductive metal oxide) layer formed on one surface thereof.

Advantageous Effects

The adhesive composition for a touch panel may provide an adhesive film having excellent step-absorbing property, high temperature reliability, and durability.

BEST MODE

Hereinafter, exemplary embodiments of the present invention will be described in detail. However, the following examples are only provided as one embodiment of the present invention, and the present invention is not limited to the following Examples.

The drawings and description are to be regarded as illustrative in nature and not restrictive. Like reference numerals designate like elements throughout the specification.

In the drawings, the thickness of layers, films, panels, regions, etc., are exaggerated for clarity. In the drawings, the thickness of layers, films, panels, regions, etc., are exaggerated for clarity.

Hereinafter, formation of any configuration in "an upper part (or a lower part) or "on (or below)" of a substrate means that any configuration is formed while contacting an upper surface (or a lower surface) of the substrate, and is not limited to exclude other constitution between the substrate and any configuration formed on (or below) the substrate.

Adhesive Composition for Touch Panel

In an exemplary embodiment of the present invention, there is provided an adhesive composition for a touch panel, including: a hydrophilic functional group-containing monomer and an adhesion promoter, wherein a dielectric constant at a frequency of 100 kHz to 2 MHz is 3.5 or less, and a storage modulus is $1.0 \times 10^5$ Pa to $7.0 \times 10^5$ Pa at 25° C. to 85° C.

A dielectric constant of the adhesive layer at a frequency of about 100 kHz to about 2 MHz may be about 3.5 or less. The polarity degree of the solvent and the copolymer may be represented by the dielectric constant, wherein when polarity is high, that is, polarity exists, the dielectric constant is highly measured, and when polarity is low, which is nonpolar, the dielectric constant is low measured. The adhesive composition for a touch panel has a dielectric constant of about 3.5 or less at a frequency of about 100 kHz to about 2 MHz. Accordingly, the adhesive composition for a touch panel may have increased sensitivity due to signal improvement to stimulus such as a touch, or the like, and may provide an adhesive film having a fast response time due to the increased sensitivity.

In addition, the adhesive composition for a touch panel has storage modulus which is improved at a high temperature, such that the adhesive composition for a touch panel has improved high temperature reliability. Here, the storage modulus indicates elasticity of the adhesive composition for a touch panel, and relates to performance characteristics of the adhesive composition, such as bonding and de-bonding behaviors. The elasticity includes a spring-like response to the force, and the spring-like property provides resistance to the force providing appropriate peel adhesion force. Specifically, the adhesive composition for a touch panel may have a storage modulus of about $1.0 \times 10^5$ Pa to about $7.0 \times 10^5$ Pa at about 25° C. to about 85° C. The storage modulus of the adhesive composition for a touch panel has the above-described range at a high temperature as described above, thereby providing high step-absorbing property and excellent durability under high temperature and high humidity condition.

The hydrophilic functional group-containing monomer may be at least one selected from the group consisting of a hydroxyl group-containing monomer, an amino group-containing monomer, a carboxyl group-containing monomer, a sulfonic group-containing monomer, a morpholine group-containing monomer, a glycidyl group-containing monomer, and combinations thereof.

Examples of the hydroxyl group-containing monomer may include (meth)acrylic acid hydroxyalkyl esters such as 2-hydroxyethyl(meth)acrylate, 4-hydroxybutyl(meth)acrylate, 5-hydroxypentyl(meth)acrylate, 6-hydroxyhexyl(meth) acrylate, 8-hydroxyoctyl(meth)acrylate, 10-hydroxydecyl (meth)acrylate, (4-hydroxymethylcyclohexyl)methyl(meth) acrylate, and the like; caprolactone-modified monomers such as caprolactone modified 2-hydroxyethyl(meth)acrylate, and the like; primary hydroxyl group-containing monomers such as 2-acryloyloxyethyl-2-hydroxyethyl-phthalic acid, N-methylol(meth)acrylamide, N-hydroxyethyl(meth) acrylamide, and the like; secondary hydroxyl group-containing monomers such as 2-hydroxypropyl(meth)acrylate, 2-hydroxybutyl(meth)acrylate, 2- hydroxy-3-phenoxypropyl(meth)acrylate, 3-chloro-2-hydroxypropyl(meth)acrylate, 2-hydroxy-3-phenoxypropyl(nneth)acrylate, and the like; tertiary hydroxyl group-containing monomers such as 2,2-dimethyl-2-hydroxyethyl(meth)acrylate, and the like.

Among the hydroxyl group-containing monomers, 2-hydroxyethyl(meth)acrylate is particularly preferable since it has little impurities such as di(meth)acrylate and is easy to be prepared.

Examples of the amino group-containing monomer may include dimethylaminoethyl (meth)acrylate, diethylaminoethyl (meth)acrylate, and the like.

Examples of the carboxyl group-containing monomers may include acrylic acid, methacrylic acid, crotonic acid, maleic acid, maleic anhydride, itaconic acid, fumaric acid, acrylamide, N-glycolic acid, cinnamic acid, Michael addition products of (meth)acrylic acid (for example, acrylic acid dimer, methacrylic acid dimer, acrylic acid trimer, methacrylic acid trimer, acrylic acid tetramer, methacrylic acid tetramer, and the like), 2-(meth)acryloyloxyethyl dicarboxylic acid monoester (for example, 2-acryloyloxyethyl succinic acid monoester, 2-methacryloyloxyethyl succinic acid monoester, 2-acryloyloxyethyl phthalic acid monoester, 2-methacryloyloxyethyl phthalic acid monoester, 2-acryloyloxyethyl hexahydrophthalic acid monoester, 2-methacryloyloxyethyl hexahydrophthalic acid monoester, and the like), and the like.

Examples of the sulfone-containing monomer may include olefin sulfones such as ethylene sulfone, allyl sulfone, meta allyl sulfone, and the like, 2-acrylamide-2-methylpropane sulfone, styrene sulfone, salts thereof, and the like. An example of the morpholine group-containing monomer may include 4-methylmorpholine, and examples of the glycidyl group-containing monomer may include glycidyl (meth)acrylate, allylglycidylether, and the like.

The hydrophilic functional group-containing monomer may have a content of about 30 parts by weight or less, based on 100 parts by weight of a (meth)acrylic acid ester-based monomer. In order to reduce polarity of the adhesive composition, the content of the hydrophilic functional group-containing monomer with a large polarity, may be defined. Accordingly, specifically, there is provided an adhesive composition including the hydrophilic functional group-containing monomer having a content of about 30 parts by weight or less, more specifically, about 20 parts by weight or less, based on 100 parts by weight of the (meth)acrylic acid ester-based monomer. Therefore, since the hydrophilic functional group-containing monomer has a defined content, the overall polarity of the adhesive composition may be reduced, and accordingly, the storage modulus which is improved at a high temperature may be secured, and further, the dielectric constant may be decreased as compared to general adhesive composition for a touch panel.

A polymer molecular weight of the (meth)acrylic acid ester-based monomer and the hydrophilic functional group-containing monomer may be about 600,000 to about 1,200,000. When the polymer molecular weight thereof is more than about 1,200,000, there is a problem in that specific gravity of the adhesive composition is increased, and when the polymer molecular weight thereof is less than about 600,000, durability is weak. Accordingly, the polymer molecular weight thereof has the above-described range according to the present invention, thereby providing excellent durability and adhesion force.

For example, the (meth)acrylic acid ester-based monomer may be alkyl(meth)acrylate, but the present invention is not limited thereto. The alkyl of the alkyl(meth)acrylate may be linear or branched $C_1$-$C_{14}$ alkyl, specifically, $C_1$-$C_8$ alkyl. By using the alkyl(meth)acrylate having the above-described range of carbon atoms, a cured product of the adhesive composition for a touch panel may be controlled to have appropriate cohesive strength, glass transition temperature and adhesive property.

The (meth)acrylic acid ester-based monomer may be at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth) acrylate, 2-ethylhexyl (meth)acrylate, 2-ethylbutyl (meth) acrylate, n-octyl (meth)acrylate, isooctyl (meth)acrylate, isononyl (meth)acrylate, lauryl (meth)acrylate, tetradecyl (meth)acrylate, and combinations thereof.

The adhesive composition for a touch panel includes an adhesion promoter together with the hydrophilic functional group-containing monomer. The adhesion promoter may be added so as to favorably polymerize the monomer included in the adhesive composition and to improve an adhesion level. In addition, by including the adhesion promoter, adhesion property may be deteriorated, and polarity may be reduced, thereby inhibiting white turbidity phenomenon of the adhesive composition applied to a liquid display device, and the like, in external environment with high temperature and high humidity, or the like.

The content of adhesion promoter is not limited, but specifically, the adhesion promoter may have a content of about 1 part by weight to about 20 parts by weight, based on 100 parts by weight of a (meth)acrylic acid ester-based monomer. On the basis of 100 parts by weight of the (meth)acrylic acid ester-based monomer, when the content of the adhesion promoter is less than about 1 part by weight, an effect of improving adhesion of the adhesive composition, may not be sufficient, and when the content of the adhesion promoter is more than about 20 parts by weight, self-cohesion phenomenon of the adhesive composition may occur, or non-reactant may be moved. Accordingly, the adhesion promoter has the above-described range of content according to the present invention, thereby maintaining compatibility with the adhesive composition and stably implementing physical properties.

The adhesion promoter is not limited in view of types, but may be at least one selected from the group consisting of an amine-based liquid polymer, polyamine, a petroleum resin, polybutene, an acrylic modified resin, an acryloyl morpholine resin, and combinations thereof.

The adhesive composition for a touch panel may further include a molecular weight regulator. The molecular weight regulator is called a chain transfer agent, which is possible to make the formed adhesive composition for a touch panel to be smooth, depending on contents. An activity point at which an addition reaction takes place in a radical polymerization for forming the adhesive composition for a touch panel from the polymer of the (meth) acrylic acid ester-based monomer and the hydrophilic functional group-containing monomer, is called a radical chain.

Here, the molecular weight regulator easily reacts with the radical chain as compared to the existing added monomers, to stops growth of the radical chain to be grown, and to provide the activity point, thereby serve to deliver the activity point to other monomers, such that the molecular weight may be regulated and the adhesive composition to be formed may be smooth. Further, by further including the molecular weight regulator, step-absorbing property of the adhesive composition for a touch panel may be improved.

The content of the molecular weight regulator is not limited, but specifically, the molecular weight regulator may have a content of about 0.01 part by weight to about 0.5 parts by weight, based on 100 parts by weight of the (meth)acrylic acid ester-based monomer. When the content of the molecular weight regulator is less than 0.01 part by weight, variation of molecular weights is small, and when the content of the molecular weight regulator is more than 0.5 part by weight, reactivity is extremely inhibited, which deteriorates durability. Accordingly, the molecular weight regulator has the above-described range, thereby improving flexibility and adhesion force of the adhesive composition.

The molecular weight regulator may be at least one selected from the group consisting of 2-mercaptoacetate, n-dodecylmercaptan, 4-4' triobisbenzenetriol, and combinations thereof. Specifically, n-dodecylmercaptan is used as the molecular weight regulator, thereby providing remarkable effects in that the molecular weight of the adhesive composition is controlled, and the adhesive composition for a touch panel is smooth.

The adhesive composition for a touch panel may further include a photoinitiator. Specifically, the photoinitiator may have a content of about 0.5 to about 1.0 parts by weight, based on 100 parts by weight of the (meth)acrylic acid ester-based monomer. When the content of the photoinitiator is out of the above-described range, a number of molecules having a short bond length are generated, which may reduce durability. The photoinitiator is not limited in view of types, but may be at least one selected from the group consisting of a benzoin-based initiator, a hydroxy ketone-based initiator, an amino-ketone-based initiator, caprolactam and combinations thereof.

Adhesive Film

In another exemplary embodiment of the present invention, there is provided an adhesive film including an adhesive layer which includes a cured product of the adhesive composition for a touch panel, the adhesive composition for a touch panel including a hydrophilic functional group-containing monomer and an adhesion promoter, based on 100 parts by weight of a (meth)acrylic acid ester-based monomer, wherein a dielectric constant at a frequency of 100 kHz to 2 MHz is of 3.5 or less and a storage modulus is $1.0 \times 10^5$ Pa to about $7.0 \times 10^5$ Pa at 25° C. to 85° C.

In curing the adhesive composition for a touch panel, electron beams, proton beams, neutron beams, and the like, may be used in addition to rays such as deep-ultraviolet rays, ultraviolet rays, near-ultraviolet rays, infrared rays, and the like, or electromagnetic waves such as X-rays, γ-rays, and the like. However, curing with ultraviolet ray irradiation is preferable in view of a curing rate, easy availability of an irradiation apparatus, the cost, and the like.

Further, a light source for performing the ultraviolet ray irradiation may be a high pressure mercury lamp, an electrodeless lamp, an extra-high pressure mercury lamp, a carbon arc lamp, a xenon lamp, a metal halide lamp, a chemical lamp, a black light, and the like. In addition, the high pressure mercury lamp may be used under condition of about 5 mJ/cm$^2$ to about 3,000 mJ/cm$^2$, preferably, about 5 m/cm$^2$ to about 1,000 cm$^2$. In addition, the electrodeless lamp may be used under condition of about 2 mJ/cm$^2$ to about 1,500 mJ/cm$^2$, preferably, about 5 m/cm$^2$ to about 500 mJ/cm$^2$.

In addition, an irradiation time may vary depending on types of light source, distance between light source and a coated surface, a coating thickness, other conditions. However, generally, the irradiation time may be several seconds to tens of seconds, or in some cases, one second per several minutes.

In the adhesive layer including the cured product of the adhesive composition for a touch panel, a dielectric constant at a frequency of 100 kHz to 2 MHz may be 3.5 or less, and a storage modulus may be about $1.0 \times 10^5$ Pa to about $7.0 \times 10^5$ Pa at about 25° C. to about 85° C. As described above, the dielectric constant and the storage modulus of the adhesive composition for a touch panel have the above-described ranges at a high temperature, thereby providing high step-absorbing property and excellent durability under high temperature and high humidity condition.

Figure 1:
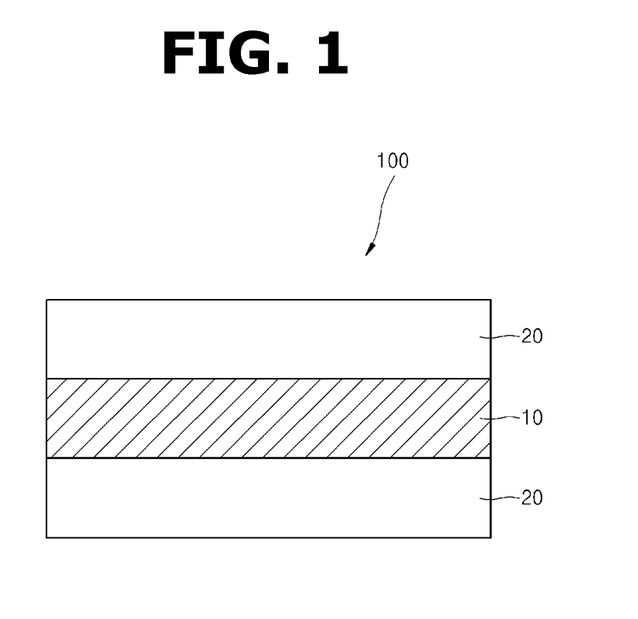
FIG. 1 is a cross-sectional view schematically illustrating an adhesive film according to an exemplary embodiment of the present invention.

FIG. 1 is a cross-sectional view schematically illustrating an adhesive film according to an exemplary embodiment of the present invention, wherein the adhesive film 100 may include a substrate layer 20, an adhesive layer 10, and a substrate layer 20 from the top. The adhesive layer 10 may have a thickness of about 50 μm to about 300 μm, specifically, about 50 μm to about 150 μm. The adhesive layer 10 has the above-described range of thickness, thereby implementing the adhesive film 100 capable of being applied to a thin touch panel or a thin touch screen and having excellent durability.

Specific types of the substrate layer 20 are not specifically limited, but for example, the substrate layer 20 may be a plastic film which is generally used in the art. For example, the substrate layer 20 may be one selected from the group consisting of polyethylene terephthalate, polytetrafluoroethylene, polyethylene, polypropylene, polybutene, polybutadiene, vinyl chloride copolymer, polyurethane, ethylene-vinyl acetate, ethylene-propylene copolymer, ethylene-ethyl acrylate copolymer, ethylene-methyl acrylate copolymer, polyimide, and combinations thereof. Specifically, the substrate layer 20 may be a polyethylene terephthalate film, but the present invention is not limited thereto.

The substrate layer 20 may have a thickness of about 25 μm to about 300 μm, specifically, about 30 μm to about 200 μm. The substrate layer 20 has the above-described range of thickness, thereby implementing the adhesive film 100 capable of being applied to a thin touch panel or a thin touch screen and having excellent durability.

Touch Panel

In still another exemplary embodiment of the present invention, there is provided a touch panel including: a conductive plastic film having a conductive layer formed on one surface; and an adhesive layer attached onto the conductive layer and including a cured product of the adhesive composition for a touch panel, the adhesive composition for a touch panel including a hydrophilic functional group-containing monomer and an adhesion promoter, based on 100 parts by weight of a (meth)acrylic acid ester-based monomer, wherein a dielectric constant at a frequency of 100 kHz to 2 MHz is 3.5 or less and a storage modulus is $1.0 \times 10^5$ Pa to about $7.0 \times 10^5$ Pa at 25° C. to 85° C.

Figure 2:
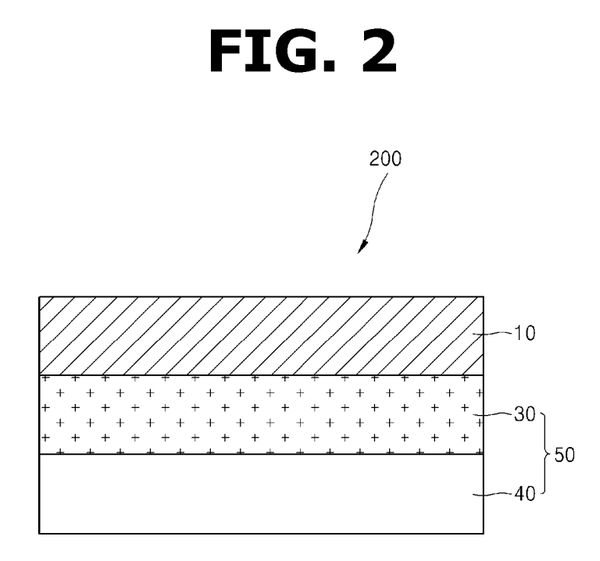
FIG. 2 is a cross-sectional view schematically illustrating a touch panel according to another exemplary embodiment of the present invention.
Figure 3:
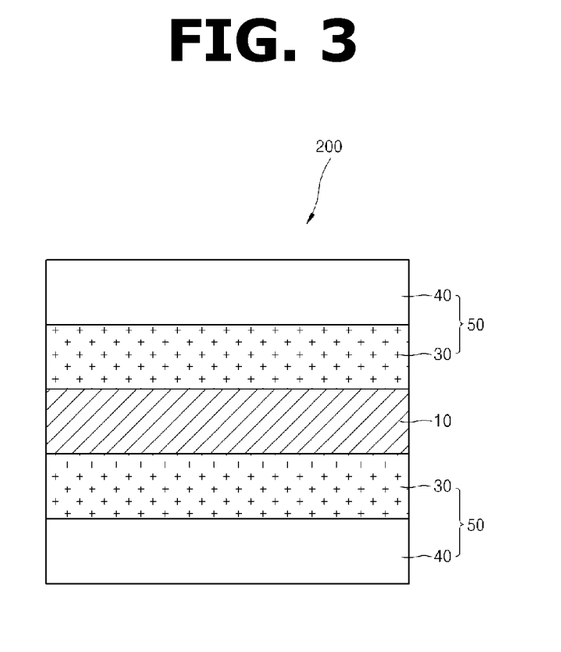
FIG. 3 is a cross-sectional view schematically illustrating a touch panel according to still another exemplary embodiment of the present invention.

Referring to FIG. 2, the touch panel 200 may include a conductive plastic film 50 including a plastic substrate layer 40 and a conductive layer 30 formed on one surface of the plastic substrate layer 40, and may have a structure in which the adhesive layer 10 is attached onto one surface of the conductive layer 30 of the conductive plastic film 50. In addition, as shown in FIG. 3, the touch panel 200 may have a structure in which the adhesive layer 10 is attached onto surfaces of both conductive layers 30 of the conductive plastic films 50.

For example, the touch panel may be a capacitive-type touch panel. In addition, a specific structure of the touch panel or a method of forming the touch panel is not specifically limited as long as the above-described adhesive composition for a touch panel is applied, but general configurations in the art may be adopted to the specific structure or the method.

Specific kinds of the conductive plastic film 50 are not particularly limited, and conductive plastic films known in the art may be used as the conductive plastic film. For example, the conductive film 50 may be a transparent plastic film having an indium tin oxide (ITO) electrode layer formed on one surface thereof. Specifically, the transparent plastic film forming the plastic substrate layer 40 may be a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, a polyimide film, and the like. However, the present invention is not limited thereto. More specifically, the plastic substrate layer 40 may be a polyethylene terephthalate (PET) film.

Hereinafter, specific Examples of the present invention are described. Meanwhile, Examples to be described below are just provided for specifically exemplifying or explaining the present invention, and accordingly, the present invention is not limited to the following Examples.

EXAMPLES AND COMPARATIVE EXAMPLES

Example 1

An adhesive composition was prepared by mixing 60 parts by weight of 2-EHA (ethylhexyl acrylate), 22 parts by weight of IBOA (isobornyl acrylate) and 15 parts by weight of HEA (hydroxyethyl acrylate), and adding 3 parts by weight of an acryloyl morpholine resin (ACMO) as an adhesion promoter, 1-hydroxy cyclohexyl phenyl ketone (Irgacure 184, HCPK) as a photoinitiator, and a coupling agent as another additive to the mixture. A coating solution was prepared by mixing toluene as a solvent, and a polyethylene terephthalate film (thickness: 75 μm) that was release-treated with the coating solution, was subjected to UV curing, followed by coating using a bar coater so that the adhesive layer has a thickness of 100 μm. Then, the film was cured by irradiation with ultraviolet rays for 10 minutes using a UV lamp, thereby manufacturing an adhesive film.

Example 2

An adhesive film was manufactured by the same method as Example 1 above except for preparing an adhesive composition further including 0.05 parts by weight of n-dodecylmercaptan as a molecular weight regulator, based on 100 parts by weight of 2-EHA (ethylhexyl acrylate).

Examples 3 to 6

Adhesive films were manufactured by the same method as Example 2 above except for changing a content ratio of the molecular weight regulator as shown in Table 1 below.

Comparative Example 1

An adhesive composition was prepared by mixing 60 parts by weight of 2-EHA (ethylhexyl acrylate), 25 parts by weight of IBOA (isobornyl acrylate), and 15 parts by weight of HEA (hydroxyethyl acrylate), and adding 1-hydroxy cyclohexyl phenyl ketone (Irgacure 184, HCPK) as a photoinitiator and a coupling agent as another additive to the mixture. A coating solution was prepared by mixing toluene as a solvent, and a polyethylene terephthalate film (thickness: 75 μm) that was release-treated with the coating solution, was subjected to UV curing, followed by coating using a bar coater so that the adhesive layer has a thickness of 100 μm. Then, the film was cured by irradiation with ultraviolet rays for 10 minutes using a UV lamp, thereby manufacturing an adhesive film.

Comparative Example 2

Adhesive films were manufactured by the same method as Comparative Example 1 above except for changing content ratios of 2-EHA (ethylhexyl acrylate) and HEA (hydroxyethyl acrylate) as shown in Table 1 below.

TABLE 1

| | EHA | IBOA | HEA | Adhesion Promoter | Molecular Weight Regulator |
|---|---|---|---|---|---|
| Example 1 | 60 | 22 | 15 | 3 | 0 |
| Example 2 | 60 | 22 | 15 | 3 | 0.05 |
| Example 3 | 60 | 22 | 15 | 3 | 0.07 |
| Example 4 | 60 | 22 | 15 | 3 | 0.09 |
| Example 5 | 60 | 22 | 15 | 3 | 0.1 |
| Example 6 | 60 | 22 | 15 | 3 | 0.2 |
| Comparative Example 1 | 65 | 25 | 10 | 0 | 0 |
| Comparative Example 2 | 60 | 25 | 15 | 0 | 0 |

Experimental Example

Physical Properties of Adhesive Film

Physical properties of the adhesive films manufactured by Examples and Comparative Examples, were manufactured, and the results thereof were shown in Table 2 below.

1) Step-absorbing property: The adhesive films of Examples and Comparative Examples were attached onto glasses each having different printing steps at a height of 10 μm to 15 μm, and then another glass was stacked on each of the adhesive films. Then, the degree of bubble occurrence was measured. Here, a step-absorbing property was measured by relatively comparing with the printing steps at which bubble did not occur, relative to the thicknesses of the adhesive films of Examples and Comparative Examples.

2) Measurement of dielectric constant: Each dielectric constant of the adhesive films of Examples and Comparative Examples each having a diameter size of 5 mm, was measured by E4980 LCR Meter manufactured by Agilent Technologies.

3) Measurement of peel strength: Each adhesive film of Examples and Comparative Examples was manufactured into a size of 25 mm×40 mm (length×width), and attached onto a non-treated PET by moving a 2 kg roller back and forth once. Then, peel strength was measured at the time of being peeled by pulling the attached adhesive film at 300 mm/min in a direction of 180 degrees with respect to a surface of the attached adhesive film.

4) Measurement of white turbidity phenomenon: The adhesive films attached onto the glasses were stored under conditions of 85° C. and 85% RH for 3 days, and then observed whether white spot occurs.

TABLE 2

| | Step-Absorbing Property (%) | Dielectric Constant (100 kHz) | Peel Strength (g/in) | White Turbidity Phenomenon |
|---|---|---|---|---|
| Example 1 | 10 | 3.5 | 3000 | No |
| Example 2 | 13 | 3.5 | 2500 | No |
| Example 3 | 15 | 3.5 | 2000 | No |
| Example 4 | 20 | 3.5 | 2800 | No |
| Example 5 | 25 | 3.5 | 2200 | No |
| Example 6 | 30 | 3.3 | 3100 | No |
| Comparative Example 1 | 5 | 3.5 | 1500 | Yes |
| Comparative Example 2 | 4 | 3.8 | 1000 | Yes |

In Examples 1 to 6, all of the adhesive films formed by using the adhesive compositions including 30 parts by weight or less of the hydrophilic functional group-containing monomer and 1 to 20 parts by weight of the adhesion promoter, based on 100 parts by weight of the (meth)acrylic acid ester-based monomer, had a step-absorbing property of 10% or more.

The step-absorbing property refers to the degree at which an ink thickness was capable of being formed without bubble occurrence, the ink being printed on glasses having each of the adhesive films of Examples and Comparative Examples interposed therebetween. As the step-absorbing property was increased, a touch panel onto which an ink layer was well attached could be provided without inclusion of air.

In particular, as compared to Example 1, Examples 2 to 6 further including the molecular weight regulator had a higher step-absorbing property, wherein the step-absorbing property was also improved as the content of the molecular weight regulator was increased, and accordingly, it could be appreciated that the adhesive composition for a touch panel was smoother by adding the molecular weight regulator.

Figure 4:
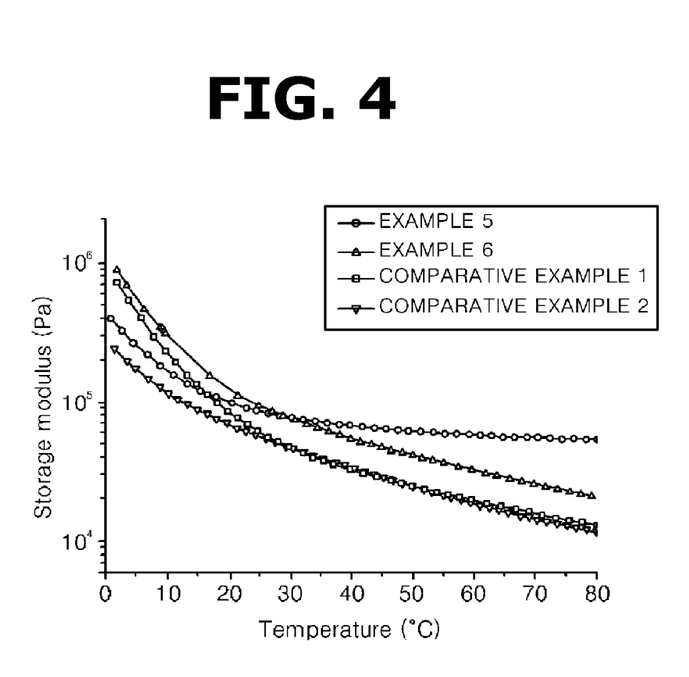
FIG. 4 is a graph illustrating storage modulus of adhesive films manufactured by Examples 5 and 6 and Comparative Examples 1 and 2 depending on temperatures.

FIG. 4 is a graph illustrating storage modulus of each of Example 5 and 6, and Comparative Examples 1 and 2, depending on temperature, and it could be confirmed that the storage modulus of Examples of 5 and 6 was higher than that of Comparative Examples 1 and 2. In proportion to the measurement values of the storage modulus, the step-absorbing property of each of Examples 5 and Example 6 was higher than that of each of Comparative Examples 1 and 2 by 25% and 30%, and accordingly, it could be appreciated that the adhesive composition for a touch panel had an increased storage modulus at a high temperature, thereby providing an adhesive film having excellent step-absorbing property.

Further, all of Examples 1 to 6 had a dielectric constant of 3.5 or less at 100 kHz, which was decreased as compared to an adhesive film using an adhesive composition including 30 parts by weight or more of the hydrophilic functional group-containing monomer, and accordingly, it could be appreciated that the adhesive films of Examples had improved sensitivity to a touch. Further, in view of peel strength, it could be appreciated that Examples had higher peel strength than that of Comparative Examples, and accordingly, rework property of the substrates could also be secured in Examples.

In Comparative Examples 1 and 2 in which the adhesion promoter was not included, a dielectric constant was decreased to some extent due to the control of the hydrophilic functional group-containing monomer, but white turbidity phenomenon occurred. However, in Examples 1 to 6 using the adhesive composition including the hydrophilic functional group-containing monomer while simultaneously the predetermined content of the adhesion promoter, occurrence of the white turbidity phenomenon was inhibited even in external environment with high temperature and high humidity.

The invention claimed is:

1. A cured adhesive layer formed from an adhesive composition for a touch panel, comprising:
   a (meth)acrylic acid ester-based monomer, a hydrophilic functional group-containing monomer, a molecular weight regulator, and an adhesion promoter,
   wherein the molecular weight regulator has a content of 0.05 parts by weight to 0.5 parts by weight, based on 100 parts by weight of the (meth)acrylic acid ester-based monomer, the hydrophilic functional group-containing monomer, and the adhesion promoter,
   wherein the molecular weight regulator is at least one selected from the group consisting of 2-mercaptoacetate, n-dodecylmercaptan, and 4-4' triobisbenzenetriol,
   wherein a dielectric constant of the adhesive layer at a frequency of 100 kHz to 2 MHz is 3.5 or less, and a step-absorbing property (%) of the adhesive layer is 13% to 30%.

2. The cured adhesive layer of claim 1, wherein the hydrophilic functional group-containing monomer is at least one selected from the group consisting of a hydroxyl group-containing monomer, an amino group-containing monomer, a carboxyl group-containing monomer, a sulfonic group-containing monomer, a morpholine group-containing monomer, and a glycidyl group-containing monomer.

3. The cured adhesive layer of claim 1, wherein the hydrophilic functional group-containing monomer has a content of 30 parts by weight or less, based on 100 parts by weight of the(meth)acrylic acid ester-based monomer.

4. The cured adhesive layer of claim 1, wherein the (meth)acrylic acid ester-based monomer is alkyl(meth)acrylate, and alkyl of the alkyl(meth)acrylate is linear or branched C1-C14 alkyl.

5. The cured adhesive layer of claim 1, wherein the (meth)acrylic acid ester-based monomer is at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate.

6. The cured adhesive layer of claim 1, wherein the adhesion promoter is at least one selected from the group consisting of an amine-based liquid polymer, polyamine, a petroleum resin, polybutene, an acrylic modified resin, and an acryloyl morpholine resin.

7. The cured adhesive layer of claim 1, wherein the adhesive composition for a touch screen panel further comprises a photoinitiator.

8. The cured adhesive layer of claim 7, wherein the photoinitiator is at least one selected from the group consisting of a benzoin-based initiator, a hydroxy ketone-based initiator, an amino-ketone-based initiator, and caprolactam.

9. An adhesive film comprising the cured adhesive layer according to claim 1.

10. A touch panel comprising:
    a conductive plastic film having a conductive layer formed on one surface; and
    the cured adhesive layer according to claim 1, wherein the cured adhesive layer is attached to the conductive layer.

11. The touch panel of claim 10, wherein the conductive plastic film is a polyethylene terephthalate film having a conductive metal oxide layer formed on one surface thereof.

* * * * *